(12) United States Patent  
Fournier et al.

(10) Patent No.: US 8,938,646 B2  
(45) Date of Patent: Jan. 20, 2015

(54) MUTATIONS ON INPUT FOR TEST GENERATION

(71) Applicant: International Business Machines Corporation, Armonk, NY (US)

(72) Inventors: Laurent Fournier, Givat Ela (IL); Anatoly Koyfman, Kiriat Yam (IL); Michal Rimon, Nofit (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 13/658,838

(22) Filed: Oct. 24, 2012

(65) Prior Publication Data

US 2014/0115396 A1 Apr. 24, 2014

(51) Int. Cl.
*G06F 11/00* (2006.01)

(52) U.S. Cl.
USPC ............................................................ 714/25

(58) Field of Classification Search
USPC ............................................................ 714/25
See application file for complete search history.

(56) References Cited

U.S. PATENT DOCUMENTS

| | | | |
|---|---|---|---|
| 5,542,043 A * | 7/1996 | Cohen et al. | 714/32 |
| 5,754,760 A * | 5/1998 | Warfield | 714/38.1 |
| 5,831,998 A * | 11/1998 | Ozmizrak | 714/741 |
| 6,298,317 B1 | 10/2001 | Wiemann | |
| 6,560,721 B1 * | 5/2003 | Boardman et al. | 714/33 |
| 6,625,760 B1 * | 9/2003 | Man et al. | 714/33 |
| 7,694,253 B2 | 4/2010 | Campos et al. | |
| 8,010,844 B2 * | 8/2011 | Lee et al. | 714/38.1 |
| 2004/0010735 A1 * | 1/2004 | Paternostro et al. | 714/38 |
| 2014/0019925 A1 * | 1/2014 | Grosse et al. | 716/107 |

FOREIGN PATENT DOCUMENTS

DE 102004037403 3/2006

OTHER PUBLICATIONS

Fine et al., "Using Bayesian networks and virtual coverage to hit hard-to-reach events", International Journal on Software Tools for Technology Transfer (STTT), vol. 11, No. 4, pp. 291-305, 2009.
Brian Marick, "The craft of software testing: subsystem testing including object-based and object-oriented testing", Prentice-Hall, 1995.
SpringSoft, "Certitude Functional Qualification System", Aug. 21, 2012 URL: http://www.springsoft.com/products/functional-qualification/certitude.

(Continued)

*Primary Examiner* — Kamini Patel
(74) *Attorney, Agent, or Firm* — Ziu Glazberg

(57) ABSTRACT

A method, apparatus and product to be used in verification. The method comprising: based on a test generation input that defines a plurality of requirements automatically determining a mutated test generation input, wherein the mutated test generation input defining a mutated requirement which is absent from the test generation input, wherein the mutated requirement is based on a requirement of the plurality of requirements and contradicts, at least in part, the plurality of requirements; and generating one or more test-cases based on the mutated test generation input, whereby the one or more test-cases violate at least one requirement of the test generation input.

15 Claims, 3 Drawing Sheets

(56) References Cited

OTHER PUBLICATIONS

Bose et al., "A genetic approach to automatic bias generation for biased random instruction generation", Proceedings of the 2001 Congress on Evolutionary Computation, 2001, vol. 1, pp. 442-448, May 2001.

Brillout et al., "Mutation-based Test Case Generation for Simulink Models", FMCO'09 Proceedings of the 8th international conference on Formal methods for components and objects, 2009.

\* cited by examiner

MUTATIONS ON INPUT FOR TEST GENERATION

TECHNICAL FIELD

The present disclosure relates generally to verification and, more particularly to generation of stimuli that is useful in verification.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in hardware or firmware may be expensive to fix, as patching it requires call-back of the computerized device. Hence, many developers of computerized devices invest a substantial portion of the development cycle to discover erroneous behaviors of the computerized device.

In functional verification, test templates are used to specify the requirements for a set of generated tests, also referred to as test-cases. The requirements can be specific, such as create a collision in a given buffer. The requirements can be generic, such as stress a given unit of the design under test (DUT). Stimuli generators take the test templates and generate many random tests that fulfill these requirements. The test-cases generated by the generators may be employed by a simulation of the DUT, such as an HDL simulator, an emulator, or the like, for testing functionality of the design.

BRIEF SUMMARY

One exemplary embodiment of the disclosed subject matter is a computer-implemented method performed by a processor, the method comprising: based on a test generation input that defines a plurality of requirements automatically determining a mutated test generation input, wherein the mutated test generation input defining a mutated requirement which is absent from the test generation input, wherein the mutated requirement is based on a requirement of the plurality of requirements and contradicts, at least in part, the plurality of requirements; and generating one or more test-cases based on the mutated test generation input, whereby the one or more test-cases violate at least one requirement of the test generation input.

Another exemplary embodiment of the disclosed subject matter is a computerized apparatus having a processor, the computerized apparatus comprising: a mutation generator configured to define a mutated test generation input based on a test generation input which defines a plurality of requirements, wherein the mutated test generation input defining a mutated requirement which is absent from the test generation input, wherein the mutated requirement is based on a requirement of the plurality of requirements and contradicts, at least in part, the plurality of requirements; and wherein based on the mutated test generation input one or more test-cases can be generated, whereby the one or more test-cases violate at least one requirement of the test generation input.

Yet another exemplary embodiment of the disclosed subject matter is a computer program product comprising: a non-transitory computer readable medium retaining program instructions, which instructions when read by a processor, cause the processor to performs the steps of: based on a test generation input that defines a plurality of requirements automatically determining a mutated test generation input, wherein the mutated test generation input defining a mutated requirement which is absent from the test generation input, wherein the mutated requirement is based on a requirement of the plurality of requirements and contradicts, at least in part, the plurality of requirements; and generating one or more test-cases based on the mutated test generation input, whereby the one or more test-cases violate at least one requirement of the test generation input.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
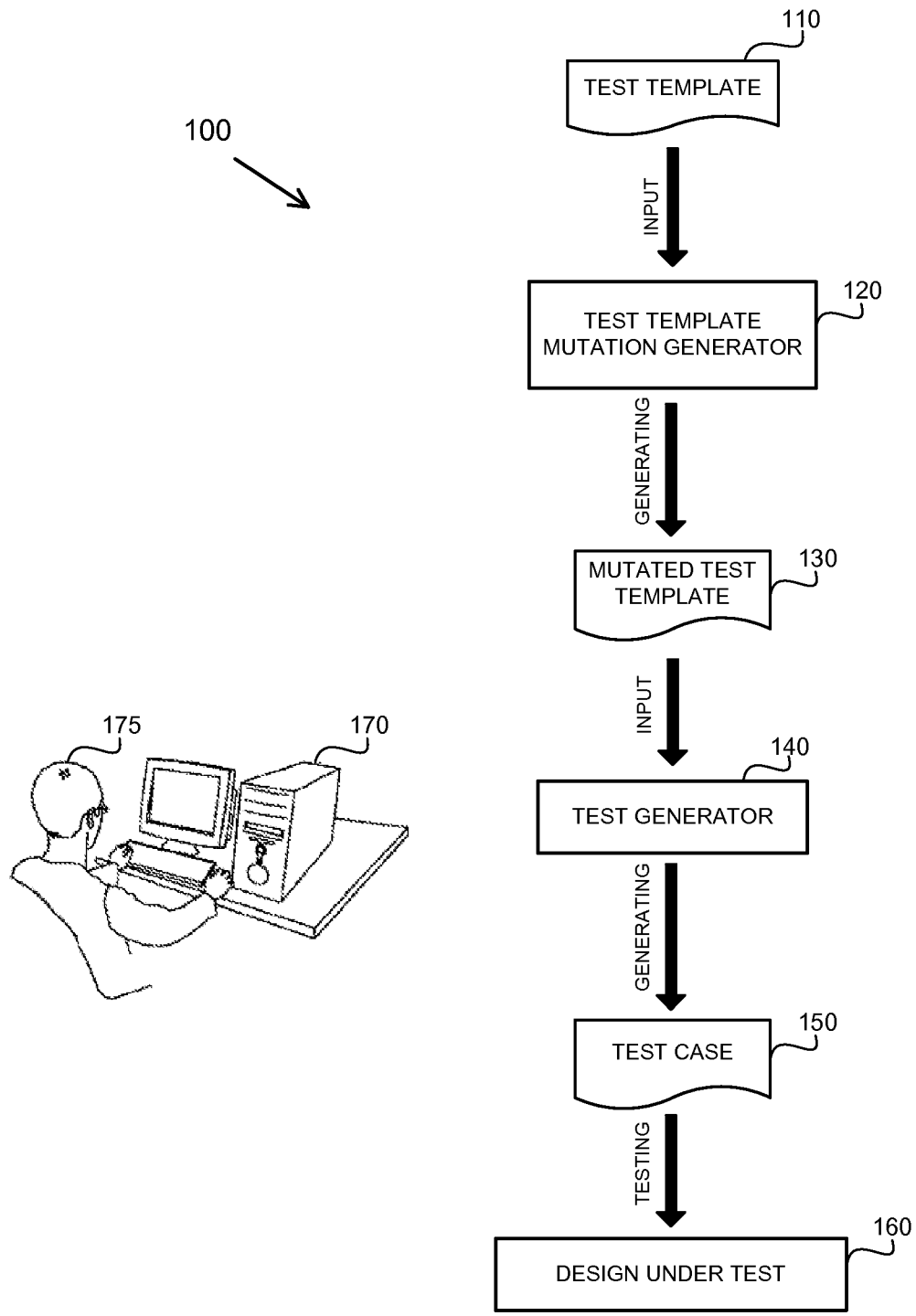
FIG. 1 shows an illustration of a computerized environment in accordance with the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure, a "design" is a circuit, processor, or similar computerized device having computational capabilities. The design may be defined using a hardware description language such as HDL, Verilog, SystemC, or the like.

In the present disclosure, a "test template" defines a set of requirements for a test-case of a design. The test template defines implicitly a set of events that can be tested. The events may stem from a desired scenario described by the test template. The test generator may employ testing knowledge to generate test-cases that are more likely to induce a flawed of the design to appear as a bug.

One technical problem dealt with by the disclosed subject matter is to generate test cases of quasi events.

In the present disclosure, a "quasi event" is an event that almost fulfills the test template requirements. In some exemplary embodiments, the quasi event fulfills some of the requirements of the test template but violates at least a small part thereof. Additionally or alternatively, the quasi event may violate at least one requirement which is a substantial requirement of the test template. As opposed to requirements that are useful for creating instructions in the test-cases that provide background noise, substantial requirements are part of the backbone of the scenario depicted by the test template.

In some exemplary embodiments, in order to increase the quality of the verification process, it may be useful to use stimuli reaching quasi events. For example, if the test template is designed to fill a buffer in the design and ensure that the design is stalled until there are vacancies in the buffer, then stimuli that almost fills the buffer may also be important to ensure that the design is not stalled unnecessarily.

Another technical problem is to automatically generate the quasi events without creating explicit test template defining the quasi events. Manual approach has the drawback of requiring users to specifically specify these events and of requiring a significant effort to create the required test templates.

One technical solution is to mutate the test template and to generate test-cases based on the mutated test template, thereby generating test cases that reach quasi events. In some exemplary embodiments, the automatically created mutations of the test template are used to intentionally miss the original requirements of the test template and hit quasi events instead.

In some exemplary embodiments, mutations may be created by a preprocessor and the mutated test template may be provided to the stimuli generator. Additionally or alternatively, the stimuli generator may internally mutate the test template and generate stimuli based on the mutation thereof.

In some exemplary embodiments, different types of mutations may be utilized. Non-limiting examples of mutation types and specific mutations for processor level stimuli generator include:

Mutations on control flow as defined by the test template, such as changing the order of two instructions, generating part of the test in a speculative path, changing expressions and conditions in the control flow of the test template, or the like.

Mutations on a required instruction by the test template, such as changing the instruction to another instruction, relaxing or modifying constraints, such as pre- and post-conditions of the instruction, or the like.

Mutations on underlining micro-architectural mechanisms, such as replacing the micro-architectural mechanism (e.g., Load Miss Queue (LMQ) instead of Store Reorder Queue (SRQ)), changing the behavior of the mechanism (e.g., Effective Address (EA) collision instead of Real Address (RA) collision), or the like.

In some exemplary embodiments, a user may control over the definition of the event neighborhood, thereby allowing the user to indicate which requirement is a fundamental requirement of the test-template that should be mutated. It will be noted that a requirement being "fundamental" may be a manner of view. Non-fundamental requirements may be, for example, requirements useful in generating background noise during the test-case, which is not part of the backbone of the scenario depicted by the test template. It will be noted that defining the event neighborhood allows for automatic generation of a plurality of mutations based on the test template and may require less manual effort than defining each quasi event scenario using a different test template.

In some exemplary embodiments, an automatic process may be designed to identify fundamental requirements, such as based on the definition of the language being used to define the test template. For example, background noise requirements may be defined using different predicates of the language and may be automatically identified.

In some exemplary embodiments, semantic mutation of the test template may be performed. Semantic mutation may require semantic understanding of the various components that are involved in the generation (e.g., the micro-architectural mechanisms) to semantically mutate them. One way to achieve this is to let the user define the semantic mutations of single components and then let the generators create (random) complex mutations out of the basic semantic mutations.

One technical effect is to reduce a manual effort required in identifying the quasi events and defining explicit test template describing each such type of quasi event.

Referring now to FIG. 1 showing an illustration of a computerized environment in accordance with the disclosed subject matter. Computerized Environment 100 is being utilized by a User 175, such as a verification engineer, a Quality Assurance (QA) staff member, developer, or the like, for testing a Design Under Test 160. User 175 may utilize a Man-Machine Interface (MMI) 170, such as a terminal, a keyboard, a pointing device, a display, or the like, to interact with Computerized Environment 100.

Test Template Mutation Generator 120 may obtain a Test Template 110 as input and generate Mutated Test Template 130. In some exemplary embodiments, based on Test Template 110 a plurality of different mutated test templates may be determined. Each mutated test template (e.g., 130) may define requirements that define a set of possible test cases. Each such possible test-case is configured to provide a quasi event stimuli to the Design Under Test 160. Each such possible test-case is in violation of at least one requirement of the Test Template 110 and would not have been generated based on the Test Template 110 itself.

Test Generator 140 is configured to generate one or more Test Cases 150 based on test templates such as Test Template 110 and Mutated Test Template 130. In some exemplary embodiments, Test Generator 140 may generate test based on both the original and mutation (i.e., 110 and 130). Additionally or alternatively, Test Generator 140 may be used to generate test cases based on a plurality of mutated test templates such as 130.

Test Case 150 may be utilized for testing the Design Under Test (DUT) 160. DUT 160 may be tested using a simulator (not shown) that simulates the functionality of the DUT 160 in response to receiving Test Case 150 as input. Additionally or alternatively, Test Case 150 may be utilized in different manners to verify DUT 160.

In some exemplary embodiments, Test Template Mutation Generator 120 may be a preprocessor providing input to Test Generator 140. Additionally or alternatively, Test Generator 140 may comprise the Test Template Mutation Generator 120 as a sub-component thereof and the generation of the mutation may be performed internally in Test Generator 140.

In some embodiments of the disclosed subject matter, a Mutation Generator, such as 120, may generate mutations on an input provided to Test Generator 140, also referred to as test generation input. One form of test generation input may be a test template. Another form may be a micro-architectural model of the design. The present disclosure focuses hereinbelow on mutation of the test generation input in the form of a test template, however such test generation input is provided as an example only and the disclosed subject matter is not limited to this type of test generation input.

Figure 2A:
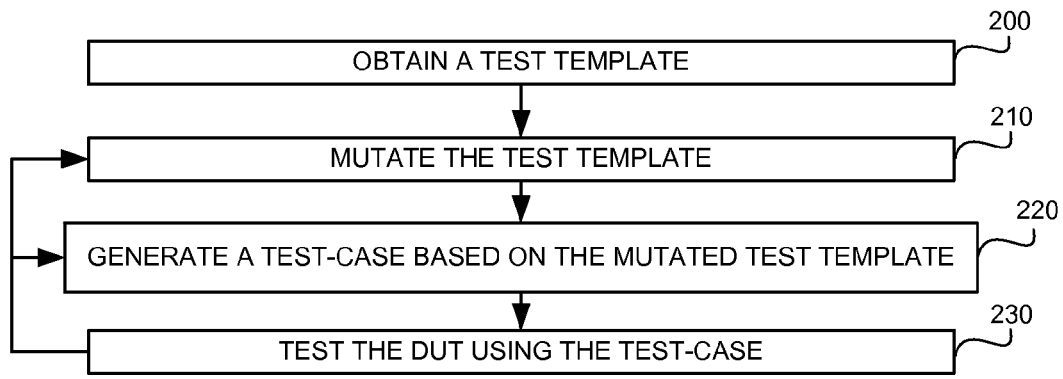
FIG. 2A shows a flowchart diagram of steps in a method for generating stimuli, in accordance with some exemplary embodiments of the disclosed subject matter.

Referring now to FIG. 2A showing a flowchart diagram of steps in a method for generating stimuli, in accordance with some exemplary embodiments of the disclosed subject matter.

In Step 200, a test template, such as 110, may be obtained.

In Step 210, the test template may be mutated, such as by a test template mutation generator 120. The mutated test template, such as 130, may be used in Step 220 for generating one or more test-cases based thereof.

In Step 230, the generated test-cases may be used for testing the DUT, such as by utilizing an HDL simulator.

In some exemplary embodiments, Steps 220-230 may be performed in a loop to generate a plurality of test cases based on the same mutated test template and to utilize the test cases for testing the DUT.

In some exemplary embodiments, Steps 210-230 may be performed in a loop to generate a plurality of different test template mutations of the test template, which may be utilized for generating test-cases useful for testing the DUT.

Figure 2B:
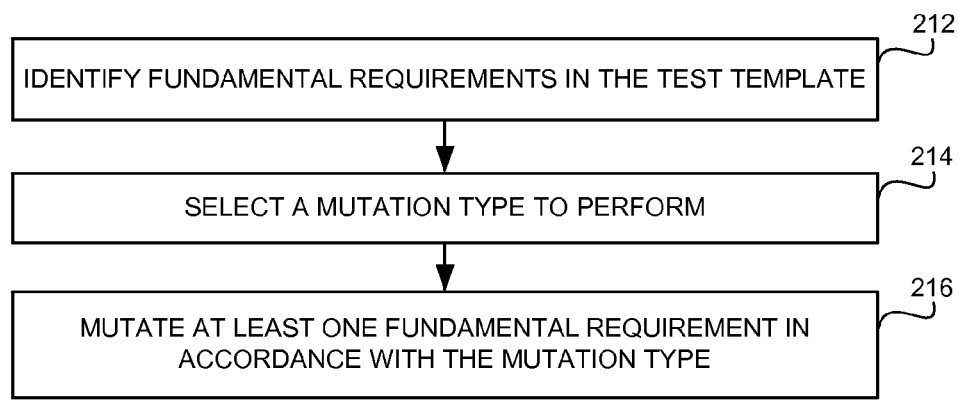
FIG. 2B shows a flowchart diagram of steps in a method for mutating a test template, in accordance with some exemplary embodiments of the disclosed subject matter.

Referring now to FIG. 2B showing a flowchart diagram of steps in a method for mutating a test template, in accordance with some exemplary embodiments of the disclosed subject matter.

In Step 212, fundamental requirements of the test template may be identified. In some exemplary embodiments, the fundamental requirements may be identified based on syntactic rules of the descriptive language used to define the test template. Additionally or alternatively, the fundamental requirements may be manually identified by the user and provided as input to an automated process.

In Step 214, a mutation type to performed may be selected. In some exemplary embodiments, the mutation type may be selected based on the fundamental requirements identified in Step 212. Such as for example, a mutation on the control flow of the test case may be selected in case there is a fundamental requirement on the control flow (e.g., a first instruction is before a second instruction). As another example, a mutation on a micro-architecture may be selected in case there is a fundamental requirement specifying or relying on a micro-architecture.

In Step 216, at least one fundamental requirement is mutated in accordance with the selected mutation type. In some exemplary embodiments, the mutation may be performed by modifying a requirement of the original test template. Additionally or alternatively, the mutation may be performed by removing a requirement of the original test template and introducing a new requirement that contradicts the removed requirement, at least in part.

In some exemplary embodiments, the mutation may be based on a semantic neighborhood of the test template so as to ensure that the mutated test template defines test cases in the semantic neighborhood.

In some exemplary embodiments, mutations may be performed without analyzing the mutated test template and the targeted events defined thereby.

Figure 3:
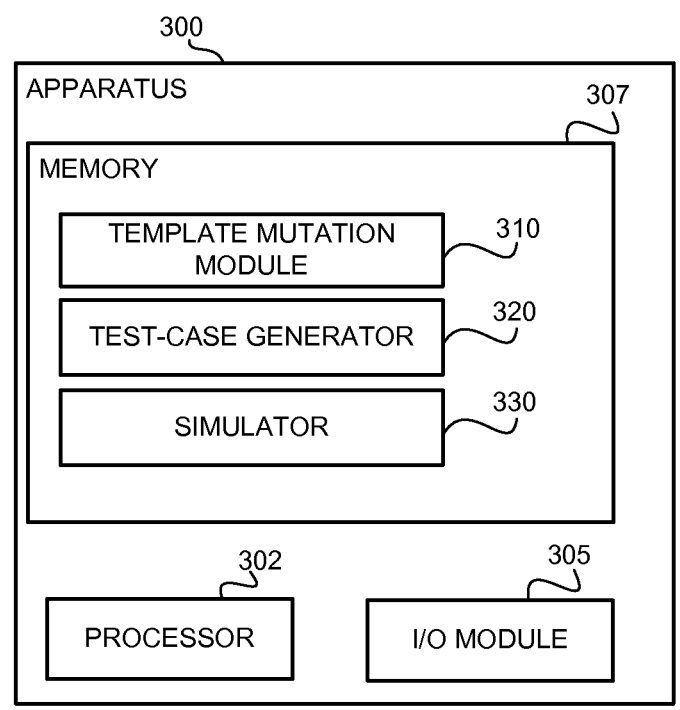
FIG. 3 shows a block diagram of components of an apparatus useful for stimuli generation, in accordance with some exemplary embodiments of the disclosed subject matter.

Referring now to FIG. 3 showing a block diagram of components of an apparatus useful for stimuli generation, in accordance with some exemplary embodiments of the disclosed subject matter. An Apparatus 300 may be a computerized apparatus adapted to perform a method such as depicted FIG. 2A-2B.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation.

In some exemplary embodiments, I/O Module 305 may be utilized to provide an interface to a user (not shown), such as 175, which may utilize an MMI (not shown), such as 170, to interact with Apparatus 300, such as by reviewing results, logs and the like, providing commands, rules, preferences, formulas or the like, or interacting in any similar manner.

In some exemplary embodiments, Apparatus 300 may comprise a Memory 307. Memory 307 may be persistent or volatile. For example, Memory 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory 307 may retain program code operative to cause Processor 302 to perform acts associated with any of the steps shown in FIG. 1 and/or FIG. 2A-2B above. In some exemplary embodiments, Memory 307 may retain the test templates, the mutated test template and/or the generated test-cases.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A Template Mutation Module 310 may be configured to obtain a test template and perform a mutation to generate a mutated test template. Template Mutation Module 310 may be configured to perform Step 210 of FIG. 2A and/or Steps 212-216 of FIG. 2B.

A Test-Case Generator 320, such as 140 of FIG. 1, may be configured to obtain to generate one or more test-cases based on a test template. In some exemplary embodiments, the test case may be a set of stimuli to the DUT, such as a set of processor level instructions for a processor being verified. In some exemplary embodiments, Test-Case Generator 320 may be configured to generate test cases based on the mutated test template.

A Simulator 330 may be configured to simulate execution of the test-case by the DUT. In some exemplary embodiments, Simulator 330 may be an HDL simulator configured to simulate the behavior of the DUT based on an HDL definition of the DUT.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processor, the method comprising:

based on a test generation input that defines a plurality of requirements automatically determining a mutated test generation input, wherein the mutated test generation input defining a mutated requirement which is absent from the test generation input, wherein the mutated requirement is based on a requirement of the plurality of requirements and contradicts, at least in part, the plurality of requirements, wherein the test generation input is a test template, and wherein the mutated test generation input is a mutated test template, wherein said automatically comprises performing a mutation on a requirement of the plurality of requirements to determine the mutated requirement, wherein the mutation is selected from a mutation of the group consisting of:

a mutation on a control flow requirement defined by the test template;

a mutation on a required instruction by the test template; and a mutation on micro-architectural mechanism defined by the test template; and generating one or more test-cases based on the mutated test generation input, whereby the one or more test-cases violate at least one requirement of the test generation input.

2. The method of claim 1, wherein the test template is associated with verification of a design under test.

3. The method of claim 1, further comprising providing the one or more test-cases to a design simulator for simulating functionality of a design under test in response to the one or more test-cases.

4. The method of claim 1, wherein said automatically determining and said generating are preformed multiple times, wherein each time a different mutated test template is determined and utilized for test-case generation.

5. A computer-implemented method performed by a processor, the method comprising:

based on a test generation input that defines a plurality of requirements automatically determining a mutated test generation input, wherein the mutated test generation input defining a mutated requirement which is absent from the test generation input, wherein the mutated requirement is based on a requirement of the plurality of requirements and contradicts, at least in part, the plurality of requirements, wherein the test generation input is a test template, and wherein the mutated test generation input is a mutated test template, wherein the plurality of requirements define a first set of requirements and a second set of requirements, and wherein the mutated test template defines the first set of requirements and a third set of requirements, wherein the third set of requirements comprises the mutated requirement and wherein the mutated requirement contradicts a requirement of the second set of requirements; and generating one or more test-cases based on the mutated test generation input, whereby the one or more test-cases violate at least one requirement of the test generation input.

6. The method of claim 1, wherein said automatically comprises performing a mutation on a requirement of the plurality of requirements to determine the mutated requirement, wherein the mutation is selected from a mutation of the group consisting of:

a mutation on a control flow requirement defined by the test template;

a mutation on a required instruction by the test template; and a mutation on micro-architectural mechanism defined by the test template.

7. The method of claim 1, wherein said automatically determining comprises performing a semantic mutation of the test template.

8. The method of claim 1, wherein said automatically determining comprises selecting the requirement to be mutated from a set of requirements of fundamental requirements defined by the test template.

9. The method of claim 1, wherein each test-case of the one or more test-cases defines a stimuli of a quasi event to events defined by the test template.

10. A computerized apparatus having a processor, the computerized apparatus comprising:

a mutation generator configured to define a mutated test generation input based on a test generation input which defines a plurality of requirements, wherein the mutated test generation input defining a mutated requirement which is absent from the test generation input, wherein the mutated requirement is based on a requirement of the plurality of requirements and contradicts, at least in part, the plurality of requirements, wherein the test generation input is a test template, and wherein the mutated test generation input is a mutated test template, wherein said automatically comprises performing a mutation on a requirement of the plurality of requirements to determine the mutated requirement, wherein the mutation is selected from a mutation of the group consisting of:

a mutation on a control flow requirement defined by the test template;

a mutation on a required instruction by the test template; and a mutation on micro-architectural mechanism defined by the test template; and wherein based on the mutated test generation input one or more test-cases can be generated, whereby the one or more test-cases violate at least one requirement of the test generation input.

11. The computerized apparatus of claim 10, wherein said apparatus operatively coupled to a test-case generator for generating the one or more test-cases based on the mutated test generation input.

12. The computerized apparatus of claim 10 wherein said apparatus operatively coupled to a design simulator, wherein the design simulator is configured to simulate functionality of a design under test using the one or more test-cases.

13. The computerized apparatus of claim 10, wherein said mutation generator is configured to perform a semantic mutation of the test template.

14. The computerized apparatus of claim 10, wherein said mutation generator is configured to select the requirement to be mutated from a set of requirements of fundamental requirements defined by the test template.

15. The computerized apparatus of claim 10, wherein each test-case of the one or more test-cases defines a stimuli of a quasi event to events defined by the test template.

* * * * *